US009834321B2

(12) United States Patent
Matthews et al.

(10) Patent No.: US 9,834,321 B2
(45) Date of Patent: Dec. 5, 2017

(54) AIRCRAFT LAUNCHING DEVICE

(71) Applicants: Taylor Evan Matthews, San Diego, CA (US); Anthony Paul Fry, San Diego, CA (US); Jessica Marie Lavigne, San Diego, CA (US); Rafy Uddin Athar, San Diego, CA (US)

(72) Inventors: Taylor Evan Matthews, San Diego, CA (US); Anthony Paul Fry, San Diego, CA (US); Jessica Marie Lavigne, San Diego, CA (US); Rafy Uddin Athar, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 71 days.

(21) Appl. No.: 14/686,330

(22) Filed: Apr. 14, 2015

(65) Prior Publication Data
US 2016/0304216 A1 Oct. 20, 2016

(51) Int. Cl.
B64F 1/04 (2006.01)
B64B 1/40 (2006.01)
(52) U.S. Cl.
CPC . *B64F 1/04* (2013.01); *B64B 1/40* (2013.01)
(58) Field of Classification Search
CPC ........................................... B64F 1/04
USPC ............................................. 244/63
See application file for complete search history.

(56) References Cited

U.S. PATENT DOCUMENTS

| 1,383,595 | A | * | 7/1921 | Black | B64F 1/04 244/110 F |
| 1,869,506 | A | * | 8/1932 | Richardson | B64D 5/00 114/252 |
| 3,989,206 | A | * | 11/1976 | Gregory | B64F 1/06 124/6 |
| 5,150,860 | A | * | 9/1992 | Young | B64F 1/10 244/50 |
| 7,111,807 | B2 | * | 9/2006 | Lipponen | B64F 1/06 124/61 |
| 7,530,527 | B2 | * | 5/2009 | Kelleher | B64C 37/02 244/2 |
| 7,562,843 | B2 | * | 7/2009 | Lipponen | F41B 3/02 124/56 |
| 8,584,985 | B2 | * | 11/2013 | Woolley | F41B 3/02 244/49 |

* cited by examiner

Primary Examiner — Brian M O'Hara
Assistant Examiner — Keith L Dixon
(74) Attorney, Agent, or Firm — Tarolli, Sundheim, Covell & Tummino LLP

(57) ABSTRACT

An apparatus for launching an aircraft secured to a balloon by a tether includes a support member and a launch arm connected to the support member and rotatable relative to the support member about an axis. At least one mechanism releasably connects the aircraft to the launch arm and has a first condition securing the aircraft to the launch arm when the aircraft has a first orientation relative to the launch arm. The release mechanism has a second condition automatically releasing the aircraft from the launch arm when the aircraft has a second orientation relative to the launch arm different from the first orientation.

19 Claims, 17 Drawing Sheets

AIRCRAFT LAUNCHING DEVICE

TECHNICAL FIELD

The invention relates to aircraft and, in particular, relates to an apparatus for launching an aircraft in a controlled manner.

BACKGROUND

Current aircraft launch devices have crane or tower operated setups with limited mobility and are restricted to launch scenarios with wind speeds less than around 5 knots. The devices are rather large, expensive, and cumbersome. Moreover, the actual launch is timed by one or more human operators who must release the aircraft in a very narrow time window to avoid the aircraft hitting the ground or crane.

SUMMARY OF THE INVENTION

In accordance with an embodiment of the present invention an apparatus for launching an aircraft secured to a balloon by a tether includes a support member and a launch arm connected to the support member and rotatable relative to the support member about an axis. At least one mechanism releasably connects the aircraft to the launch arm and has a first condition securing the aircraft to the launch arm when the aircraft has a first orientation relative to the launch arm. The release mechanism has a second condition automatically releasing the aircraft from the launch arm when the aircraft has a second orientation relative to the launch arm different from the first orientation.

In accordance with another embodiment of the present invention an apparatus for launching an aircraft secured to a balloon by a tether includes a base for placement on a surface. A support member is pivotably mounted to the base within a first plane. A launch arm is connected to the support member and rotatable relative to the support member within a second plane perpendicular to the first plane. A plurality of release mechanisms connect the aircraft to the launch arm. The release mechanisms have a first condition securing the aircraft to the launch arm when an angle between the launch arm and the tether is below a predetermined degree. The release mechanisms have a second condition automatically releasing the aircraft from the launch arm when the angle between the launch arm and the tether reaches the predetermined degree.

Other objects and advantages and a fuller understanding of the invention will be had from the following detailed description of the preferred embodiments and the accompanying drawings.

DETAILED DESCRIPTION

The invention relates to aircraft and, in particular, relates to an apparatus for launching an aircraft in a controlled manner. FIGS. 1-10 illustrate an apparatus 30 for launching an aircraft 300 in accordance with an embodiment of the present invention. The aircraft 300 can constitute any known aircraft or spacecraft such as, for example, a balloon (weather, communications, etc.), drone (relay network, surveillance, missile detection, etc.) or other self- or wind-propelled aircraft or spacecraft. As shown, the aircraft 300 constitutes a balloon 302 cooperating with a gondola 310 for forming a bay station for telecommunications in the sky.

Figure 1:
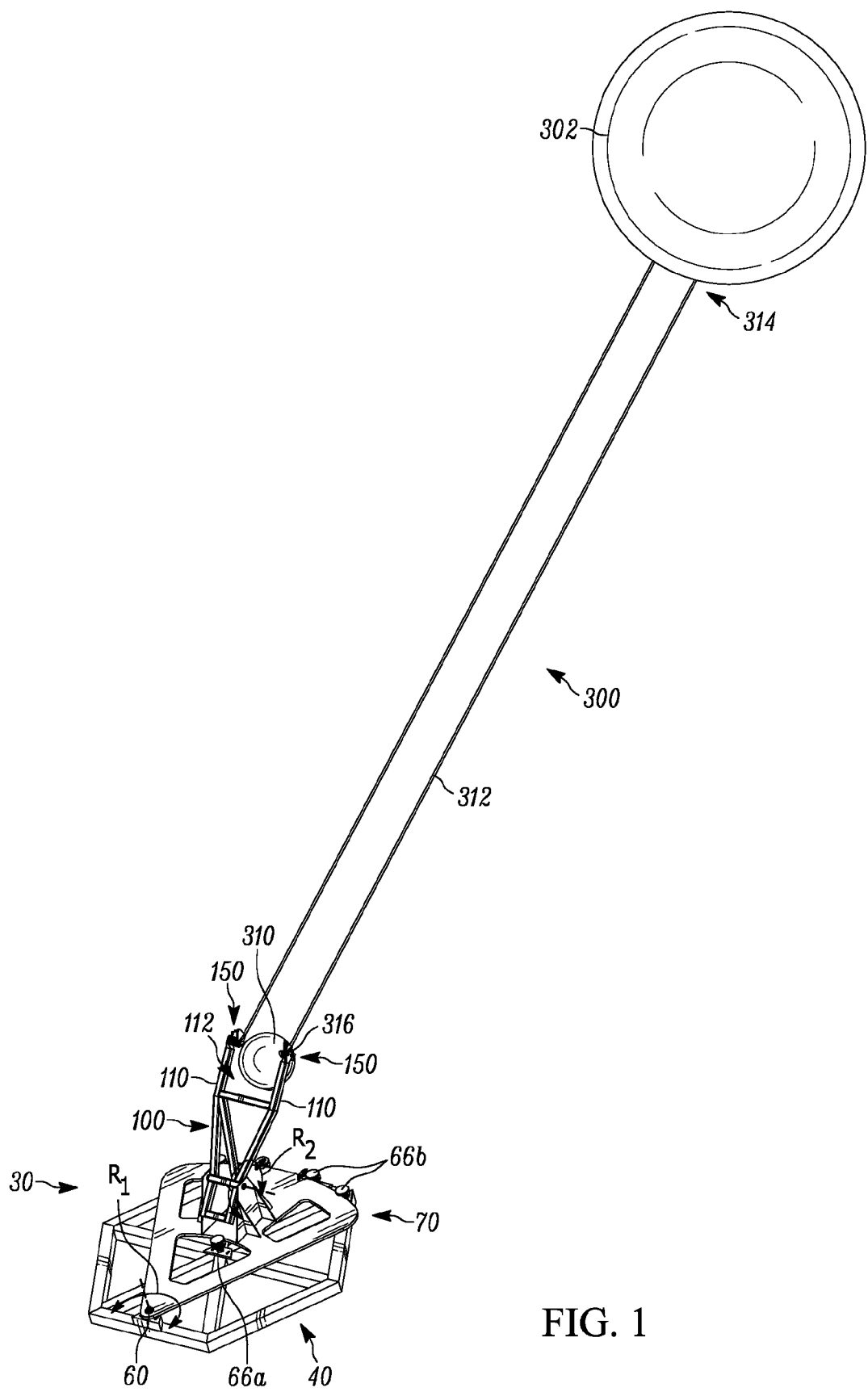
FIG. 1 is a schematic illustration of an aircraft launch apparatus and aircraft in accordance with an aspect of the present invention.

Referring to FIG. 1, the apparatus 30 includes a base 40, a support member 70 connected to the base, a launch arm 100 pivotably connected to the support member, and at least one release mechanism 150 for connecting the aircraft 300 to the launch arm. Alternatively, the base 40 can be omitted (not shown). The base 40 (FIG. 2) has a generally polygonal shape, e.g., hexagonal, formed by a plurality of interconnected tubes 42. The tubes 42 can be made of a lightweight, durable material, such as plastic or metal. Some tubes 42 intersect one another at a center 44 of the base 40.

The base 40 includes an upper surface 50 and a periphery 52. One or more guide pins 66a, 66b are secured to the upper surface 50 of the base 40 and extend away from the upper surface. As shown, a single guide pin 66a is provided at the center 44 of the base 40 and a series of guide pins 66b is provided along the periphery 52 of the base. Each guide pin 66a, 66b is cylindrical and includes an annular groove 68 extending about the periphery of the guide pin. A bearing 60 defining an axis 62 is positioned on an end or side of the base 40 opposite the peripheral guide pins 66b.

Figure 2:
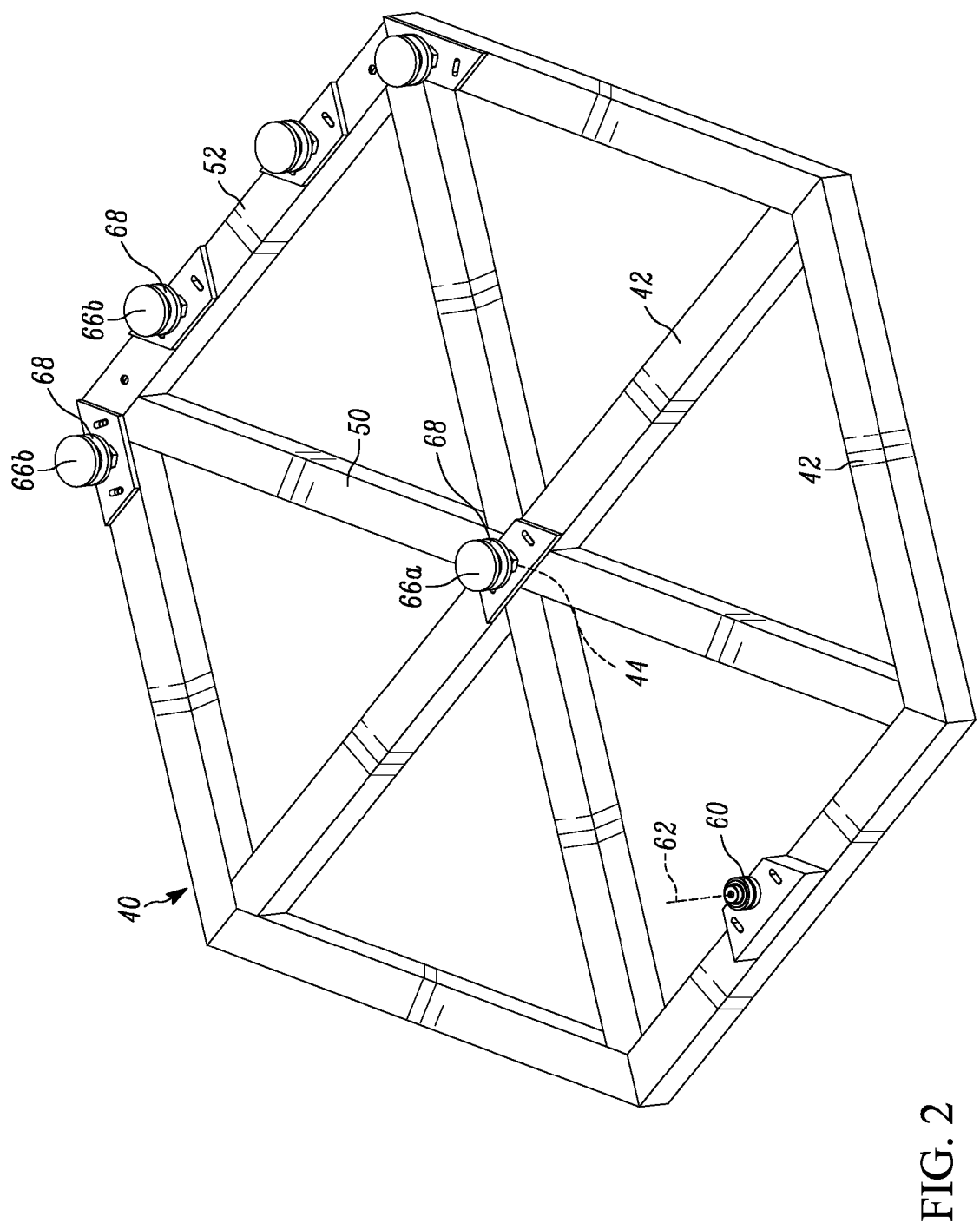
FIG. 2 is an isometric view of a base of the launch apparatus of FIG. 1.
Figure 3:
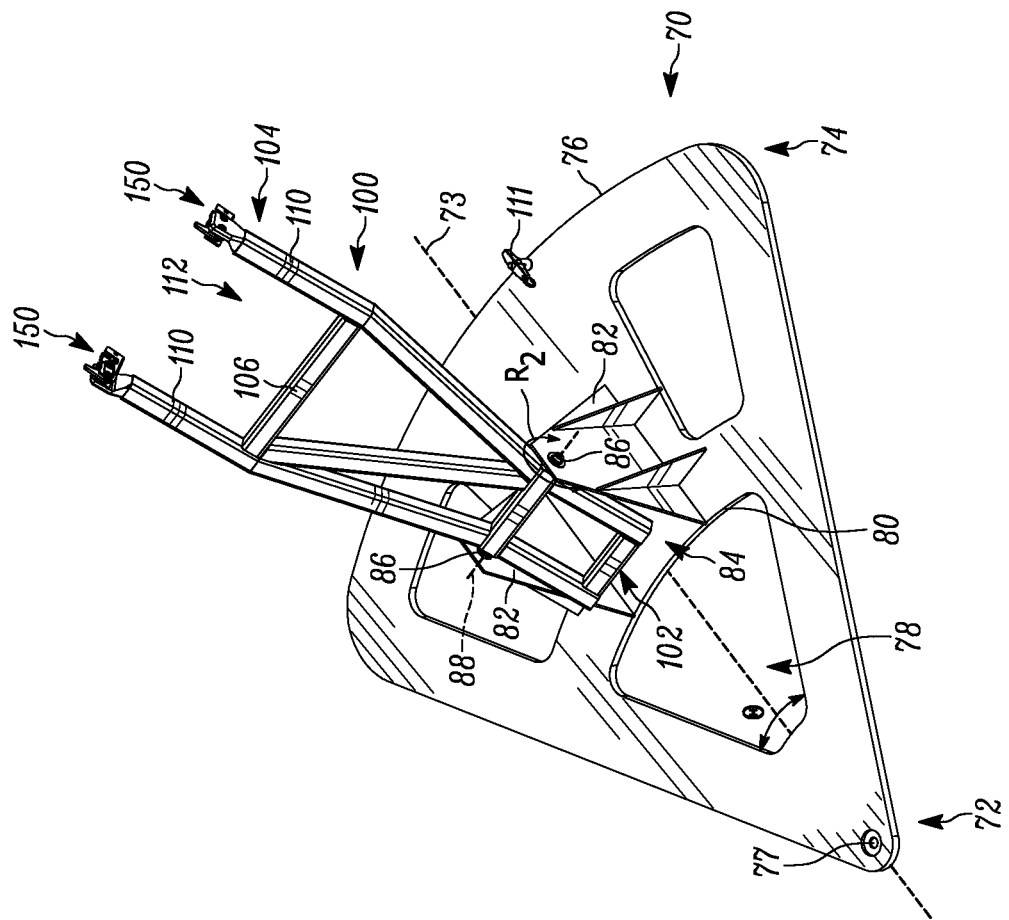
FIG. 3 is an isometric view of a support member and launch arm of the launch apparatus of FIG. 1.

Referring to FIGS. 2-3, the support member 70 is triangular and extends along a centerline 73 from a first end 72 to a second end 74. The support member 70 can alternatively have a round or other polygonal shape (not shown). A recessed opening 77 is provided at the first end 72 of the support member 70. The support member 70 includes a periphery 76 and at least one opening 78 defined by an inner surface 80. The sides of the opening 78 closest to the first end 72 extend at an angle θ relative to one another. The angle θ can be, for example, from about 0° to about 90°. As shown, the angle θ is about 45° and centered about the centerline 73.

A pair of projections 82 extends from the upper surface 50 of the support member 70 away from the base 40. The projections 82 are spaced apart from one another to define an interior space 84. The interior space 84 extends generally along the centerline 73 and is aligned with the recessed opening 77.

The launch arm 100 has an elongated frame 106 formed from a series of interconnected tubes. The launch arm 100 extends from a first end 102 to a second end 104. A pair of bearings 86 pivotably connect the first end 102 to the projections 82. The bearings 86 define an axis 88 about which the launch arm 100 is rotatable in a direction $R_2$ within a generally vertical plane. The second end 104 includes a pair of arms 110 spaced apart to define an interior space 112. A release mechanism 150 is secured to each arm 110.

Figure 4:
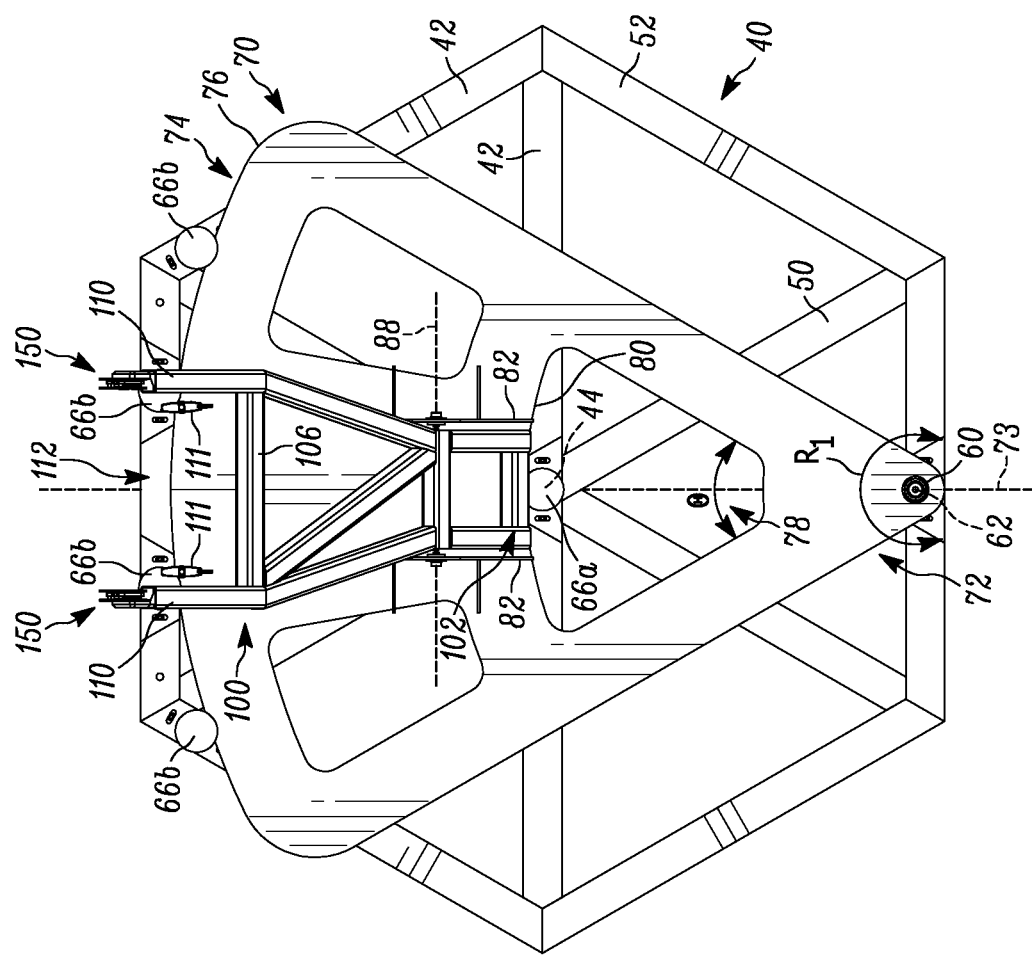
FIG. 4 is a top view of a portion of FIG. 1.

Referring to FIGS. 1 and 4, the bearing 60 is positioned in the recessed opening 77 in the support member 70 to pivotably secure the support member to the base 40. The support member 70 is secured to the base 40 such that the inner surface 80 is positioned within the groove 68 in the center guide pin 66a and the periphery 76 of the support member 70 extends into the grooves 68 in the peripheral guide pins 66b. Pivotable movement of the support member 70 relative to the base 40 is guided and limited by the guide pins 66a, 66b. More specifically, movement of the inner surface 80 along the center guide pin 66a is limited by the angle θ of the opening 78. Consequently, the support member 70 can pivot within a generally horizontal plane about 22.5° in either direction from the centerline 73 in directions $R_1$ (see FIG. 4). One or more locking members 111 can extend through the support member 70 and into a groove or openings (not shown) in the base 40 to lock the support member in a particular position about the axis 62.

Referring to FIGS. 5A-5D, each release mechanism 150 includes a frame 152, a retaining member 200, a trigger member 250, a biasing spring 230, and a pair of axles 206, 256. The frame 152 includes a pair of plates 160, 161 defining an interior space 162 in which the retaining member 200 and trigger member 250 reside. The plates 160, 161 further define an upper opening 164 and a rear opening 168 (as viewed in FIGS. 5A and 5D). The plate 160 is generally rectangular and includes a pair of circular openings 170, 172 extending therethrough. A notch 174 having, for example, a U-shape, also extends through the plate 160. Both openings 170, 172 are positioned on the same side of the notch 174. Similarly, the plate 161 is generally rectangular and includes a pair of circular openings 180, 182 (FIG. 5D) extending therethrough. A notch 184 having, for example, a U-shape, also extends through the plate 161. Both openings 180, 182 are positioned on the same side of the notch 184.

The retaining member 200 (FIGS. 5B and 5C) has a C-shaped construction and extends from a first end 202 to a second end 204. The axle 206 extends through, and is fixed to, the first end 202 for rotatably mounting the retaining member 200 to the plates 160, 161. The first end 202 includes a notch or groove 208 extending radially towards the axle 206. The second end 204 includes a pair of spaced apart projections 210 defining a space 212 therebetween.

The trigger member 250 includes a first end 252 and a second end 254. The axle 256 extends through, and is fixed to, the first end 252 for rotatably mounting the trigger member 250 to the plates 160, 161. The first end 252 includes a tab or projection 258 extending radially away from the axle 256. The tab 258 is configured to mate with the groove 208 in the retaining member 200. The second end 254 constitutes an elongated projection 260 extending away from the axle 256.

Figure 5A:
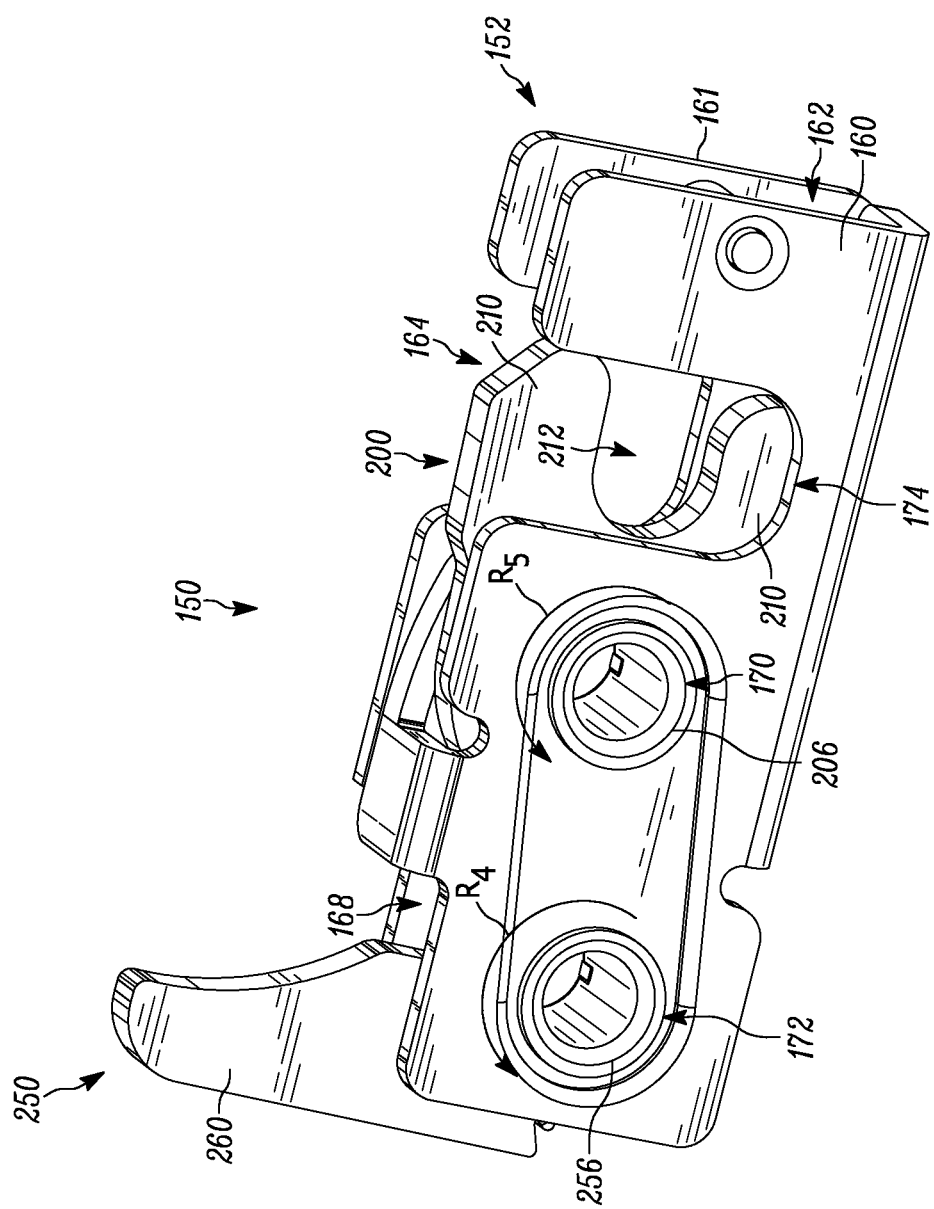
FIG. 5A is a front view of a release mechanism of the launch apparatus of FIG. 1.
Figure 5B:
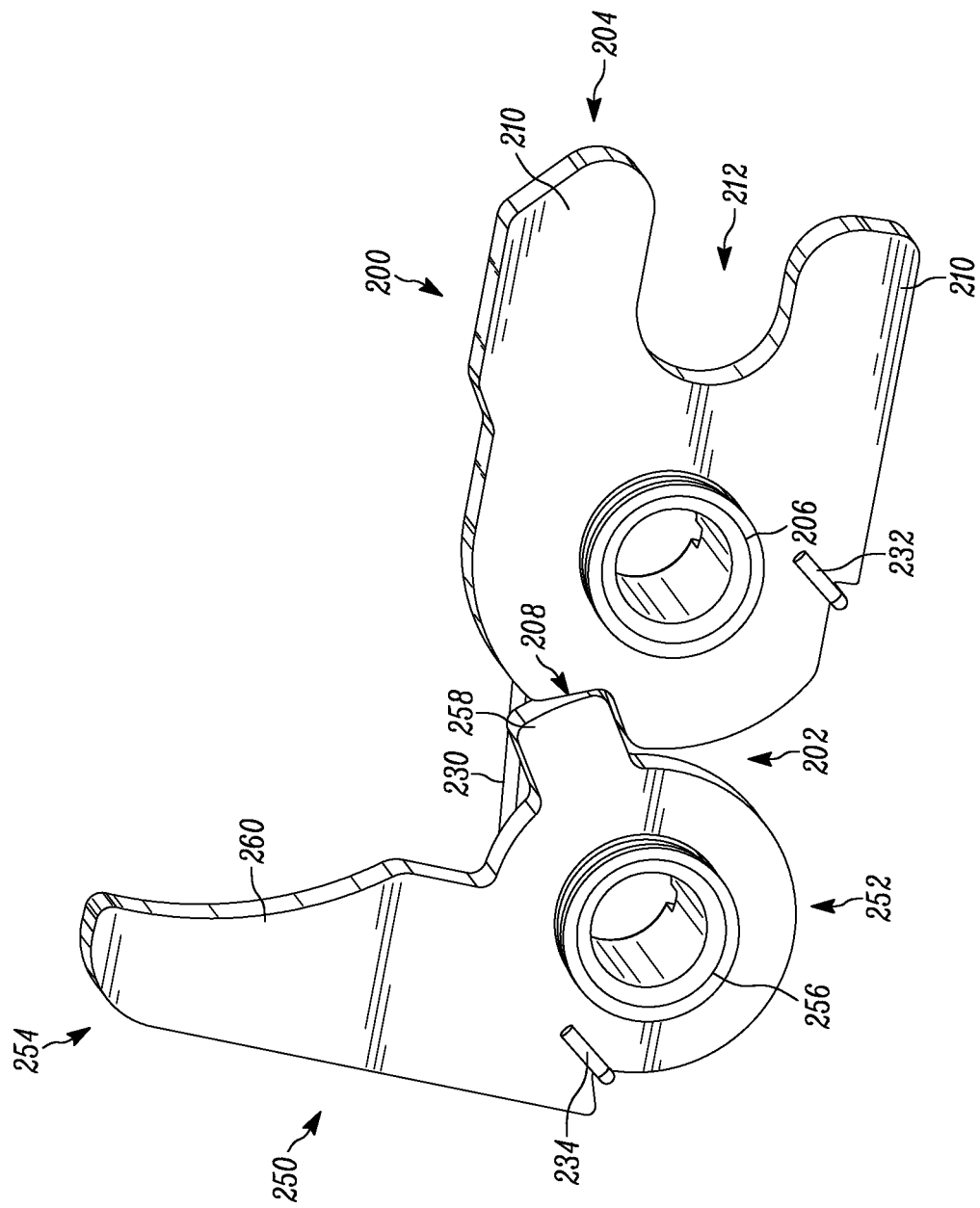
FIG. 5B is a front view of a portion of the release mechanism of FIG. 5A.
Figure 5C:
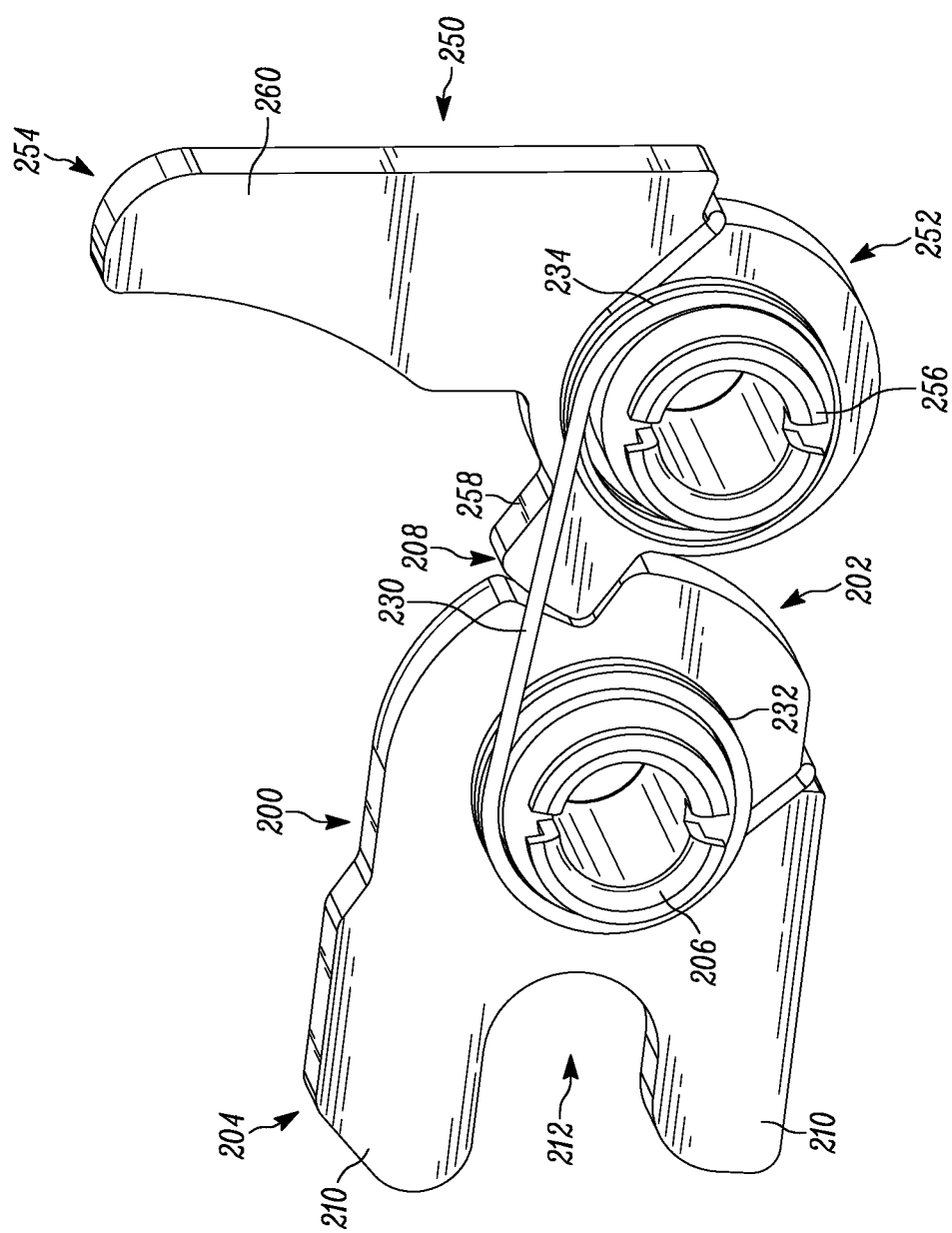
FIG. 5C is a rear view of FIG. 5B.
Figure 5D:
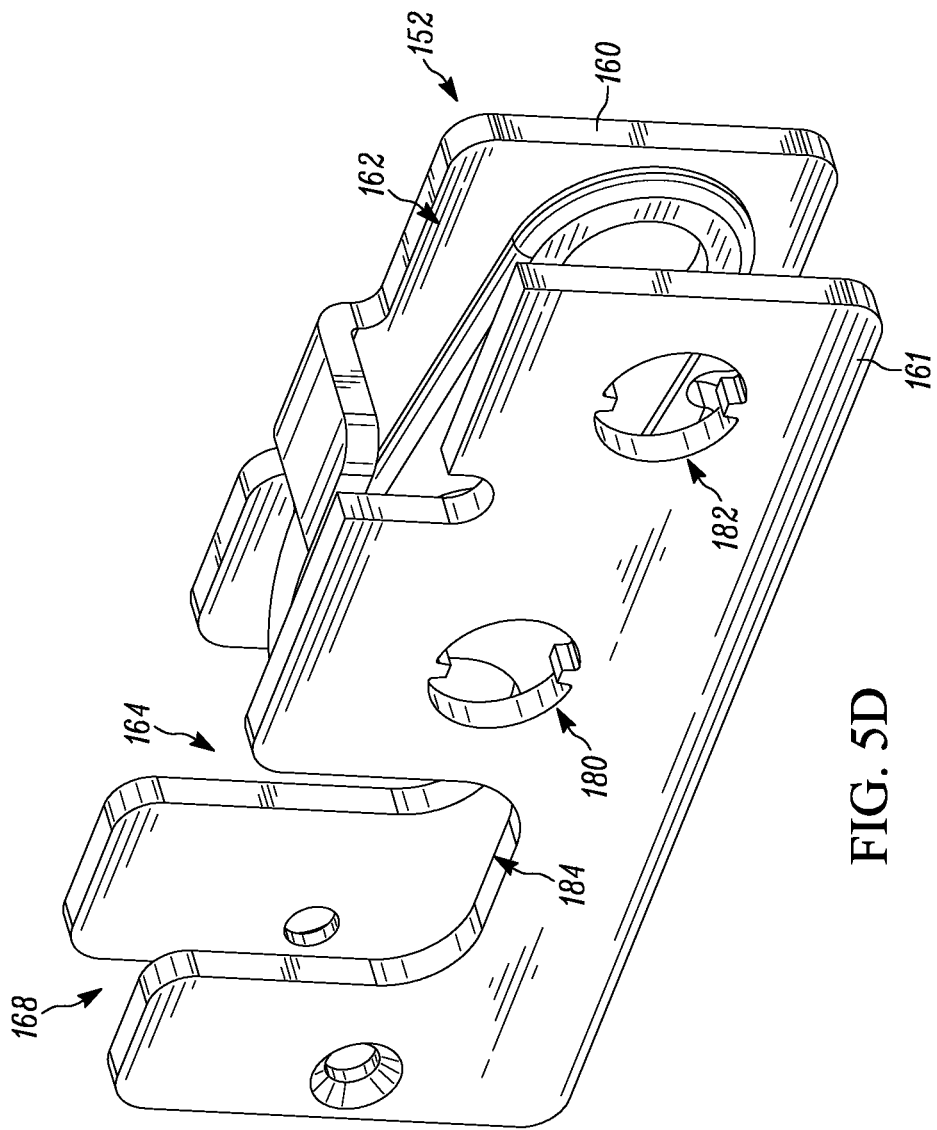
FIG. 5D is a rear view of another portion of the release mechanism of FIG. 5A.

The retaining member 200 and trigger member 250 are held together in a pre-assembled state by a spring 230 having first and second ends 232, 234 (FIGS. 5B and 5C). The first end 232 is wound around/secured to the axle 206 connected to the retaining member 200. The second end 234 is wound around/secured to the axle 256 connected to the trigger member 250. With the spring 230 connecting the retaining member 200 and trigger member 250 to one another, the tab 258 is positioned within the notch 208. The spring 230 rotatably biases the retaining member 200 and trigger member 250 towards one another when mounted to the plates 160, 161, thereby biasing the tab 258 into engagement with the notch 208.

When the release mechanism 250 is assembled (FIG. 5A), the interconnected retaining member 200 and trigger member 250 are positioned within the interior space 162 between the plates 160, 161. The axle 206 is rotatably mounted in the openings 170, 180 in the plates 160, 161. The axle 256 is rotatably mounted in the openings 172, 182 in the plates 160, 161. The retaining member 200 and trigger member 250 are oriented within the interior space 162 such that the space 212 is positioned between the notches 174, 184 in the plates 160, 161. The projection 260 extends out of the frame 152 through the rear opening 168. The trigger member 250 is rotatable with the axle 256 relative to the frame 152 in the direction $R_4$. The retaining member 200 is rotatable with the axle 206 relative to the frame 152 in the direction $R_5$. The spring 230 biases the retaining member 200 and trigger member 250 to rotate in directions opposite the directions $R_4$, $R_5$, respectively.

Figure 6:
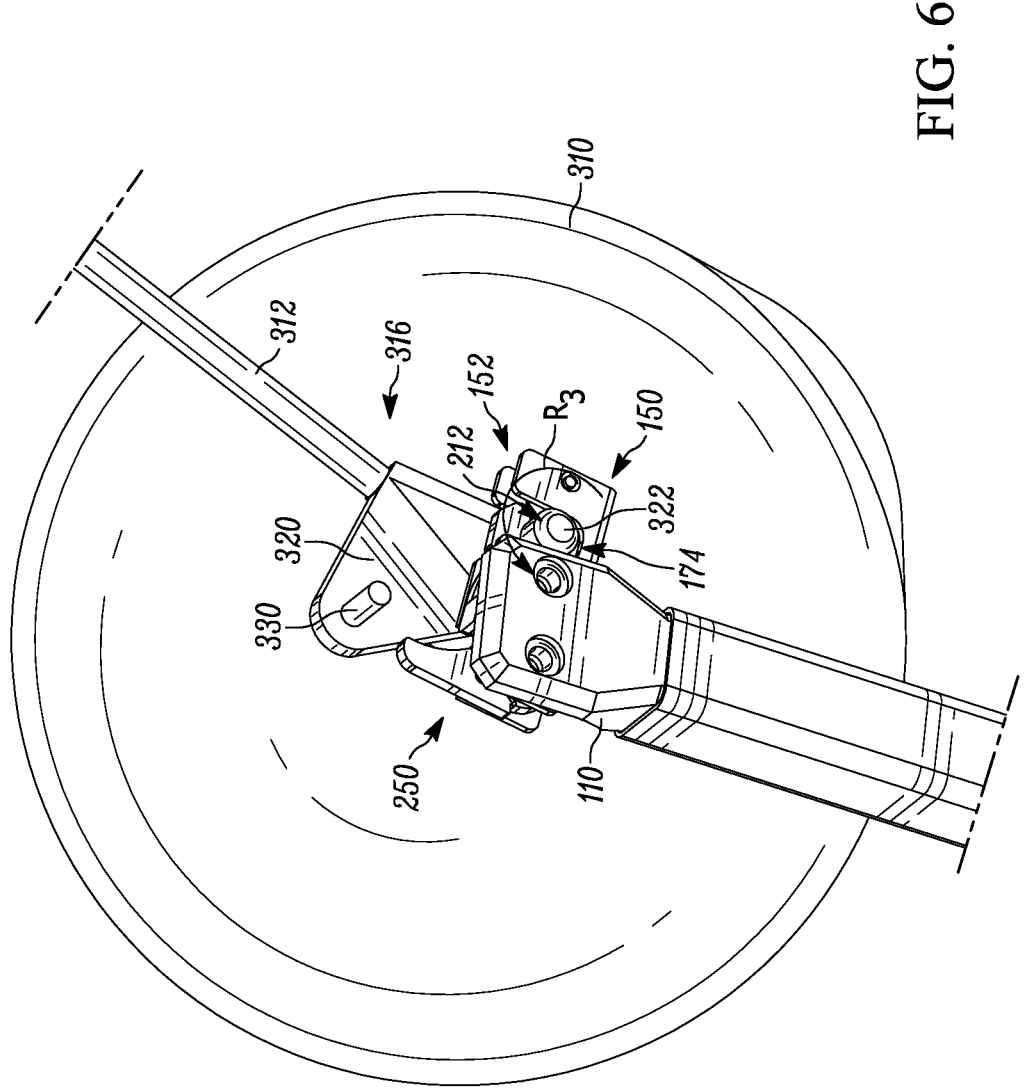
FIG. 6 is an enlarged view of a portion of FIG. 1.

As shown in FIGS. 1 and 6, the aircraft 300 includes a gondola 310 releasably connected to the launch arm 100 and a balloon 302 for launching the gondola into the sky. A tether 312 includes a first end 314 connected to the balloon 302 and a second end 316 connected to the gondola 310. A pair of brackets 320 secured to the second end 316 of the tether 312 cooperate with the release mechanisms 150 for launching the aircraft 300 from the launch arm 100.

A first pin 322 (FIG. 6) projects from each side of the gondola 310 and extends through one of the brackets 320 so as to be rotatable relative to the bracket. Each first pin 322 passes into one of the release mechanisms 150. A second pin 330 extends from each bracket 320 and is initially spaced from the associated release mechanism 150. The connection between the first pins 322 and the release mechanisms 150 allows the brackets 320 to rotate about the first pins in the direction $R_3$ relative to the release mechanisms.

Figure 7A:
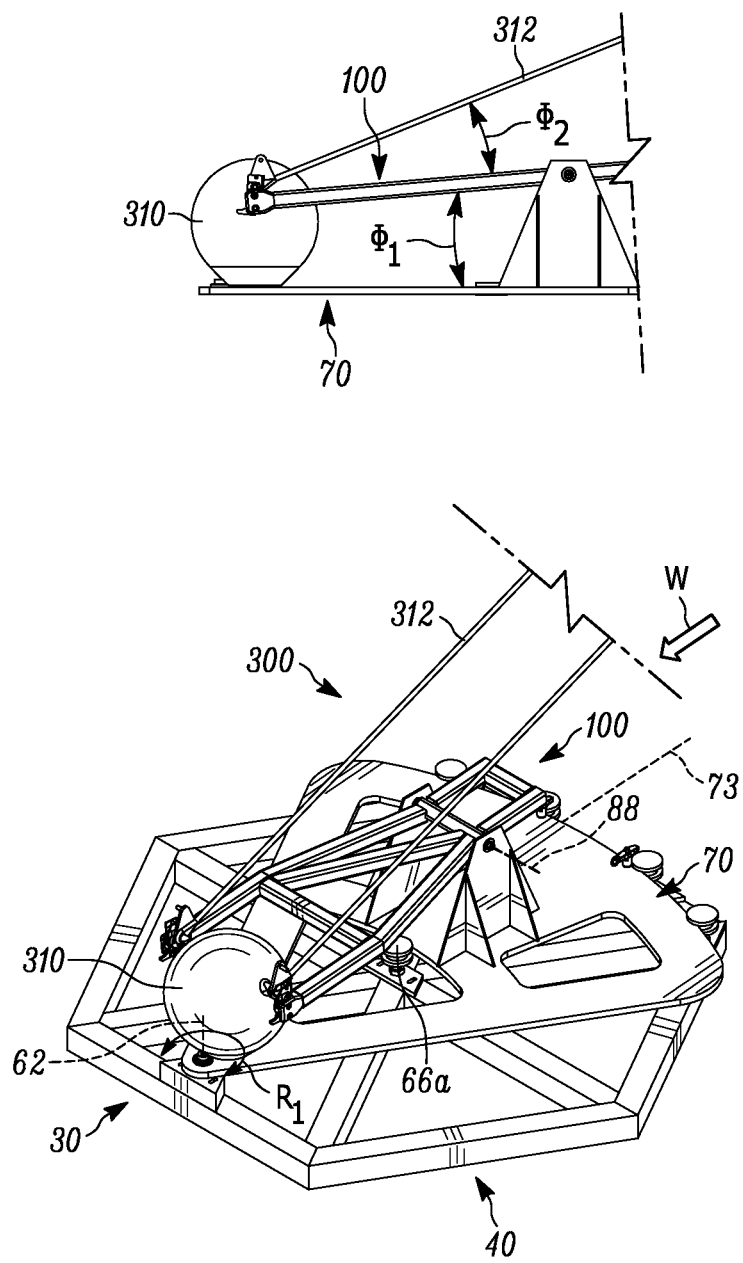
FIGS. 7A-7D illustrate a sequence of launching the aircraft using the launch apparatus.

Referring to FIGS. 7A-7D, during operation, the apparatus 30 is placed on the ground in a location where it is desirable to launch the aircraft 300. This can constitute placing either the base 40 (when present) or the support member 70 directly onto the ground in a position that generally aligns the centerline 73 of the support member with the direction of the wind W. The launch arm 100 is rotated downwards about the axis 88 toward the support arm 70 (FIG. 7A). As shown, the launch arm 100 is pivoted downwards until it extends roughly parallel to the support member 70. The angle between the launch arm 100 and the support member 70, also known as the launch angle, is designated by $\Phi_1$ and is variable. At this point, the launch angle $\Phi_1$ approximates 0°.

The aircraft 300 is positioned near the apparatus with the balloon 302 in a deflated condition (not shown) connected to the gondola 310 with the tether 312. The gondola 310 is positioned in the interior space 112 between the arms 110 of the launch arm 100. The retaining member 200 is rotated in the direction $R_5$ and the trigger member 250 rotated in the direction $R_4$ to allow the first pins 322 to pass through the openings 164 and into the space 212 of the retaining member and the notches 174, 184 in the frame 152. The retaining member 200 and trigger member 250 are released, allowing the bias of the spring 230 to rotate the members 200, 250 in directions opposite to the directions $R_4$, $R_5$. This rotation places both projections 210 of the retaining member 200 within the interior space 262 to prevent the first pins 322 from passing freely through the openings 164 and out of the release mechanisms 150. This rotation also places the tabs 258 on the trigger members 250 into engagement with the notches 208 on the retaining members 200, thereby securing the first pins 322 within the release mechanisms 150. In this condition, the tether 312 is not taught and extends at an acute angle $\Phi_2$ relative to the lowered launch arm 100.

Figure 7B:
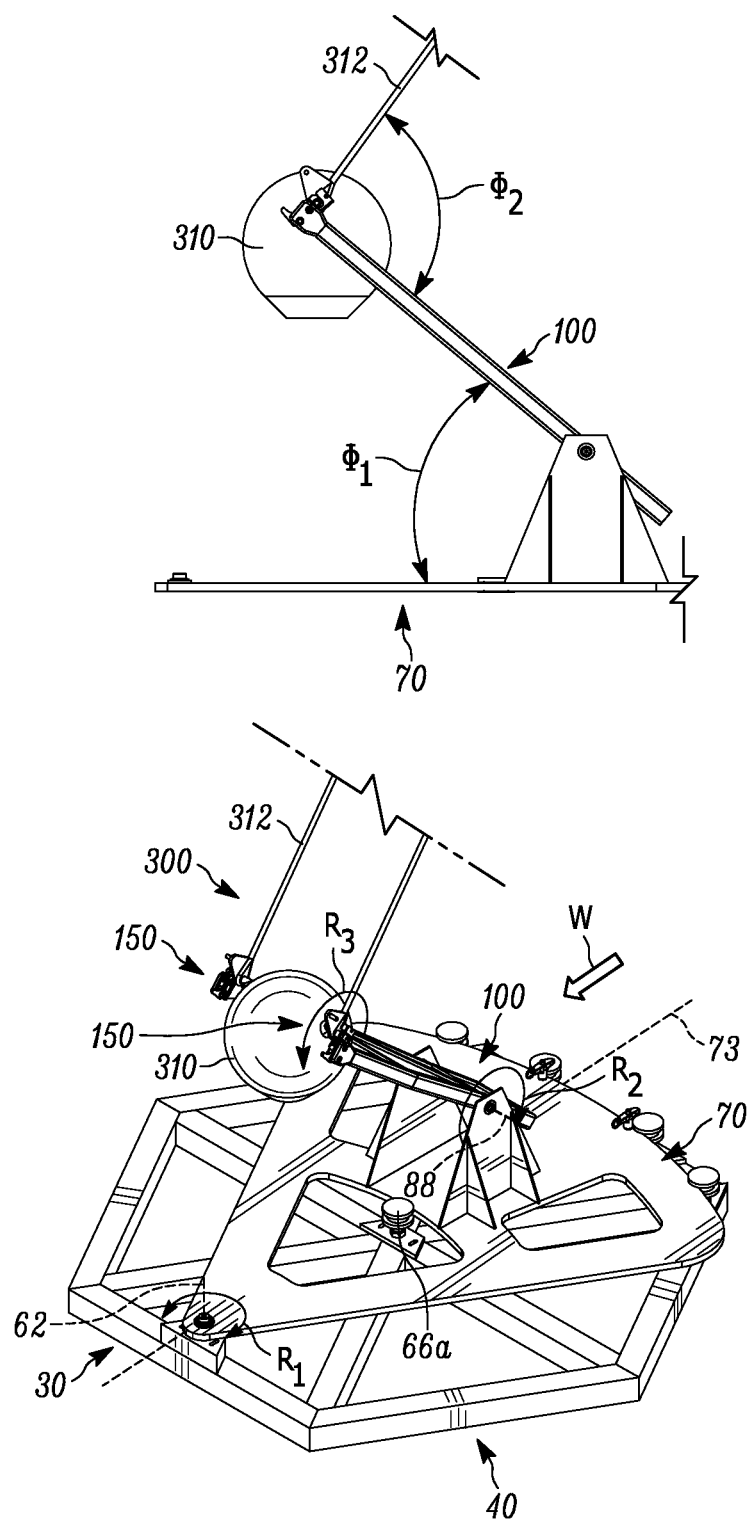

Once the gondola 310 is secured to the launch arm 100, the balloon 302 is filled with helium or otherwise inflated with a gas that causes the balloon 302 to rise. As the balloon 302 inflates, the tether 312 becomes taught and the rising balloon 302 pulls the gondola 310 towards as sky (FIG. 7B). Since the gondola 310 is secured to the arms 110, the rising gondola causes the launch arm 100 to pivot upwards in the direction $R_2$. As the launch angle $\Phi_1$ increases, the angle $\Phi_2$ between the launch arm and the tether 312 also increases.

Figure 7C:
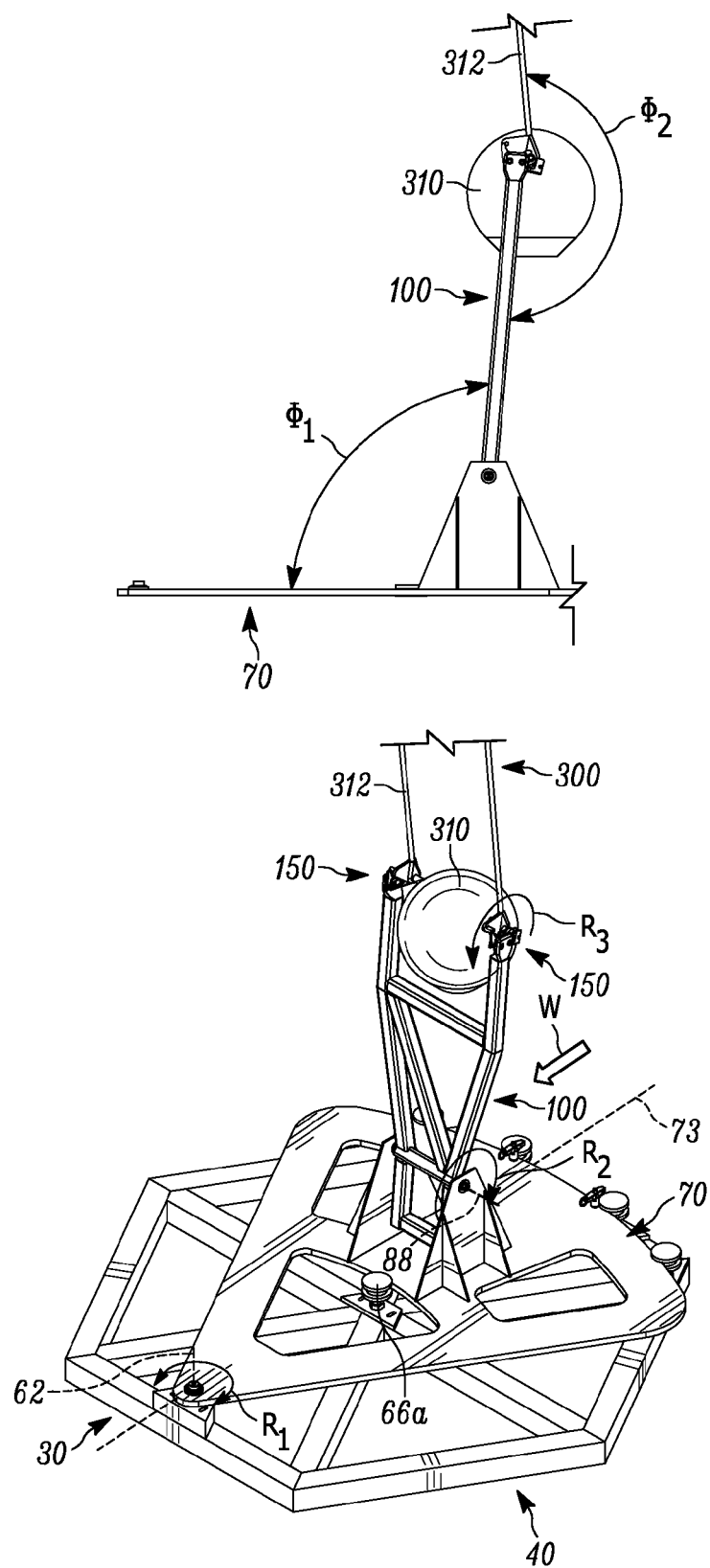
Figure 7D:
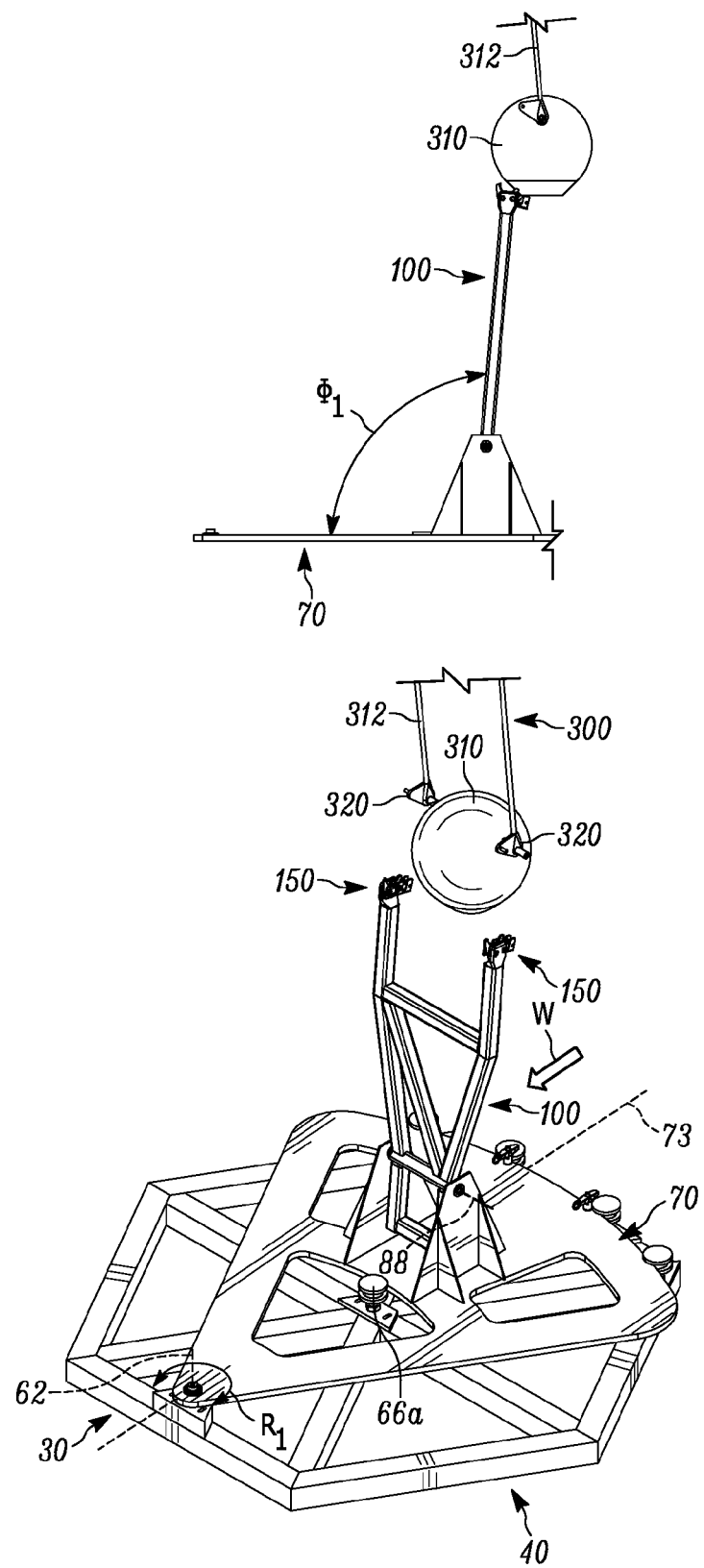

The release mechanisms 150 are configured to automatically release the gondola 310 from the launch arm 100 when the angle $\Phi_2$ reaches a predetermined degree or amount. As shown in FIGS. 7C and 7D, the predetermined amount for the angle $\Phi_2$ is at or substantially close to 180°, i.e., the launch arm 100 and tether 312 are substantially aligned with one another in an end-to-end manner. The predetermined amount for the angle $\Phi_2$ can, however, be less than 180°. It will therefore be appreciated that the release mechanisms 150 hold onto the aircraft 300 while the aircraft has a first orientation relative to the release mechanism, e.g., the angle $\Phi_2$ is less than the predetermined amount, and automatically releases the aircraft when the aircraft has a second, different orientation relative to the release mechanisms, e.g., the angle $\Phi_2$ reaches the predetermined amount.

Figure 8B:
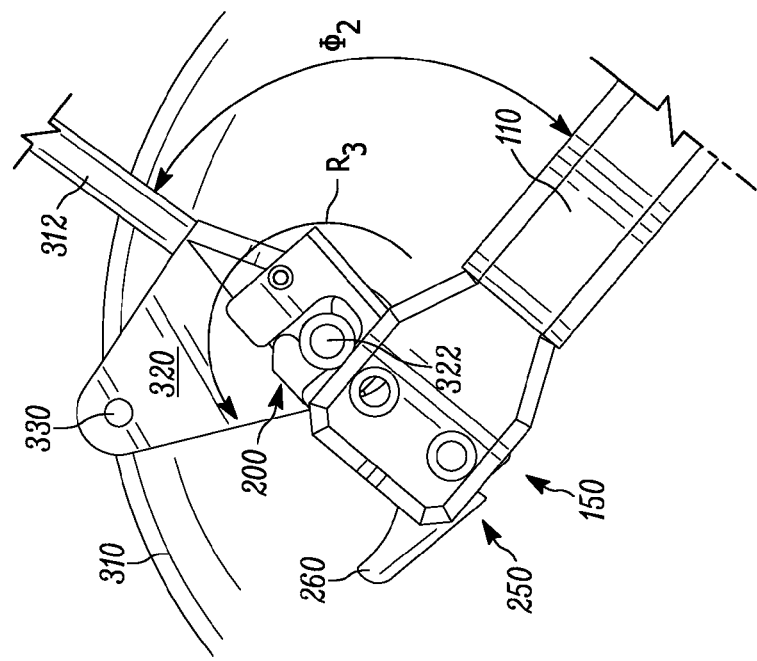
FIGS. 8A-8D illustrate the release mechanism during the sequence of FIGS. 7A-7D.
Figure 8A:
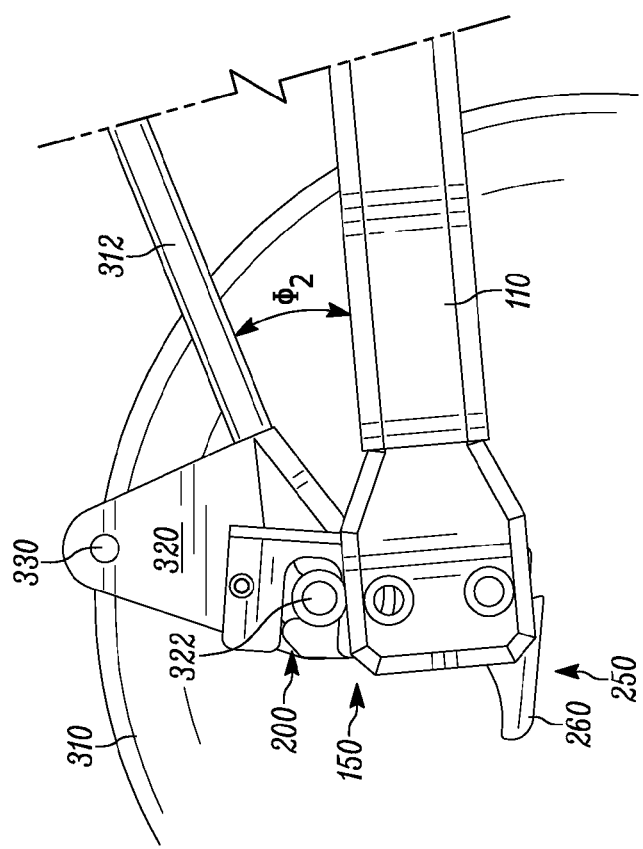
Figure 8D:
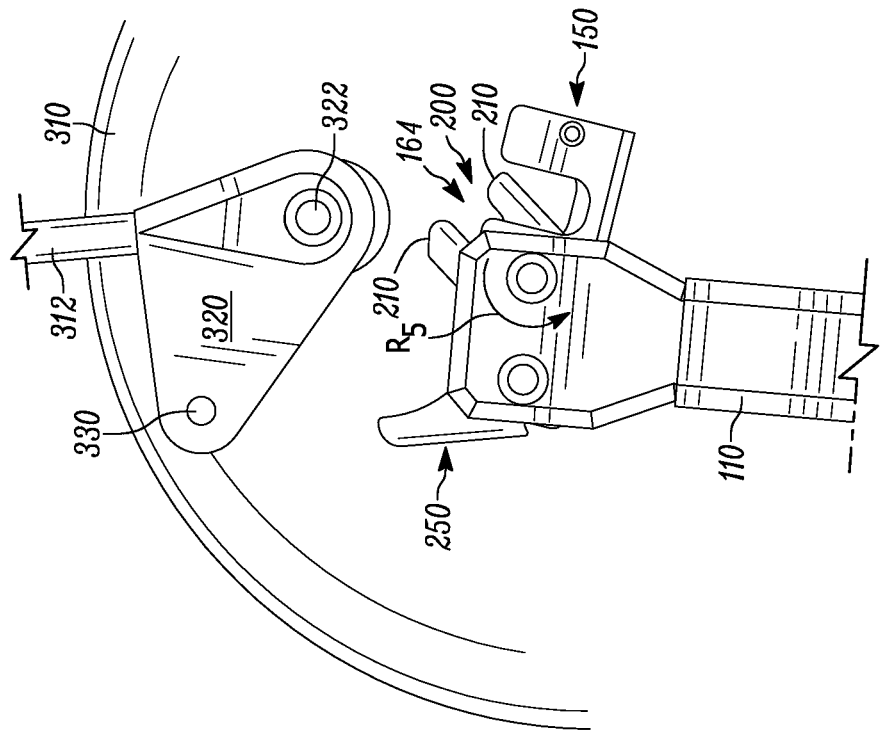
Figure 8C:
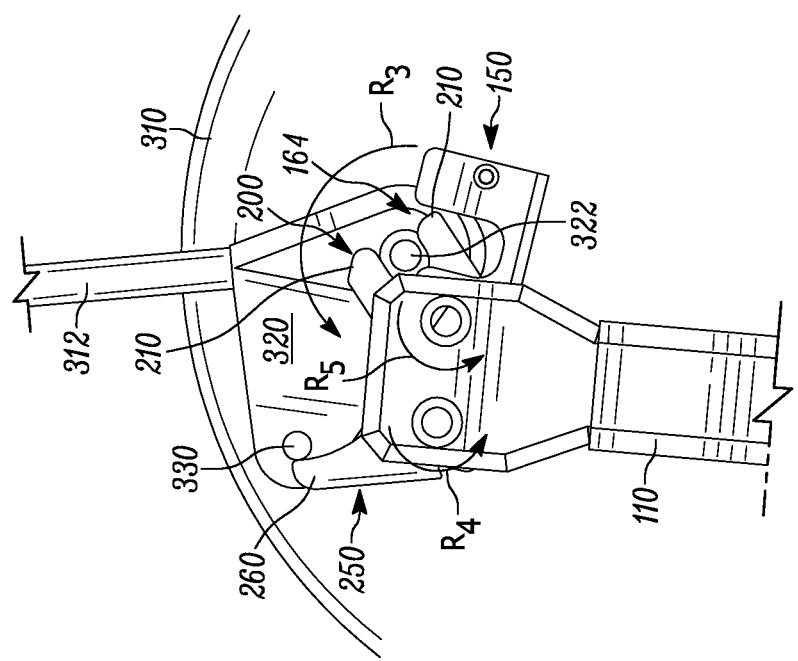

Referring to FIGS. 8A-8D, as the balloon 302 rises, the brackets 320 pivot about the first pins 322 in the direction $R_3$ to increase the angle $\Phi_2$ between the tether 312 and the launch arm 110. As the angle $\Phi_2$ increases, the second pins 330 move closer to the projections 260 on the trigger members 250 until the second pins engage the projections (FIG. 8C). The second pins 330 then rotate the trigger members 250 with the axles 256 in the direction $R_4$ against the bias of the spring 230. This causes the tabs 258 on the trigger members 250 to move out of engagement with the corresponding notches 208 in the retaining members 200 (see FIG. 5B). As a result, the retaining members 200 are free to rotate with the axles 206 in the direction $R_5$ relative to the trigger members 250.

To this end, since the rising balloon 302 continues to apply an upward force to the tether 312, the first pins 322 are likewise biased upward. Consequently, the first pins 322 engage the projections 210 and cause rotation of the retaining members 200 in the direction $R_5$ until the first pins exist the release mechanisms 150 via the openings 164. The released first pins 322 then move with the gondola 310 and tether 312 upwards into the sky with the rising balloon 302 (FIGS. 7D and 8D).

Figure 9B:
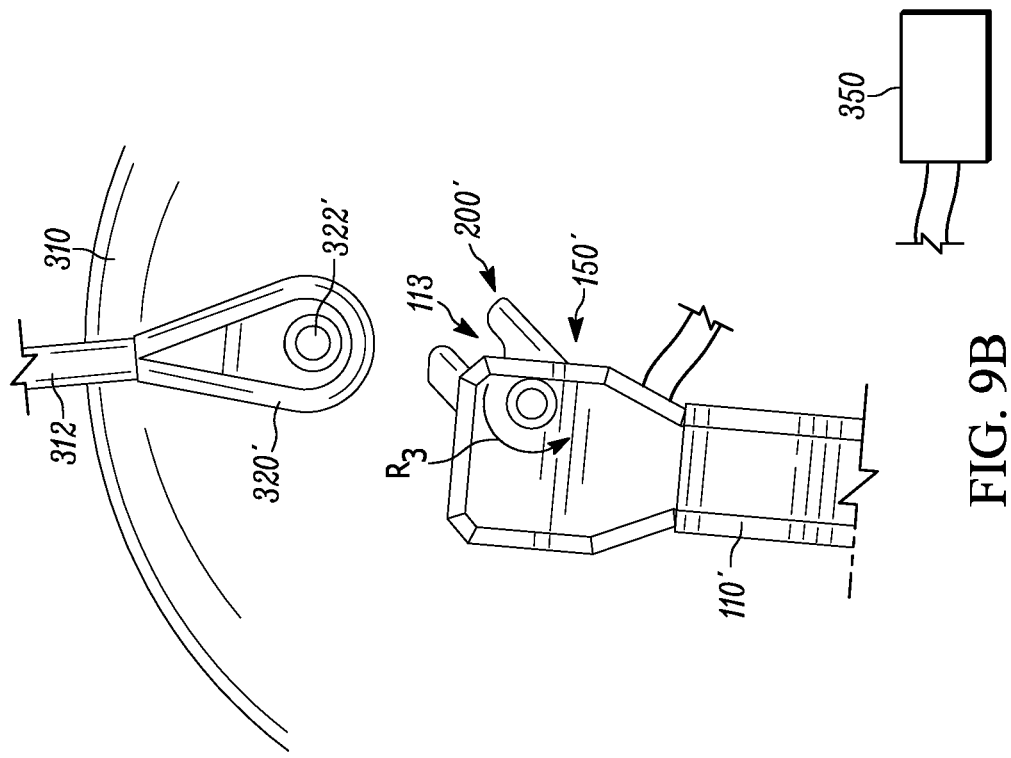
FIGS. 9A-9B illustrate an alternative embodiment of the release mechanism.
Figure 9A:
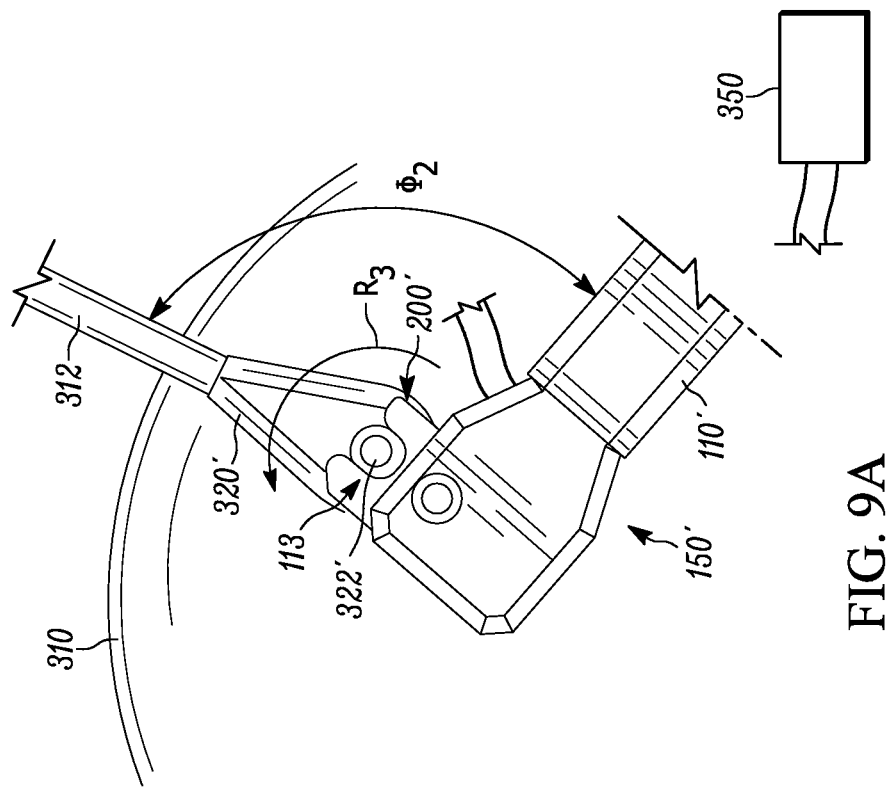

A release mechanism 150' having an alternative configuration is illustrated in FIGS. 9A-9B. In this configuration, the trigger members 250 and second pins 330 are omitted. Each retaining member 200' includes a round, e.g., cylindrical, groove 113 configured to receive the first pins 322' extending from the gondola 310. The retaining members 200' are electromagnetic and connected to an electrical source 350. The first pins 322' are formed from a magnetic material.

The release mechanism 150' is configured such that the magnetic first pins 322' are secured within the grooves 113 while the electrical source 350 supplies electricity to the arms 110, i.e., while the retaining members 200' are energized. Consequently, the gondola 310 is secured to the launch arm 100 as long as the first pins 322' and retaining members 200' are magnetically coupled together.

Alternatively, the grooves 113 can be formed directly into the arms 110 at the second ends 104 of the launch arm 100 (not shown). In such a configuration, the frame 152, retaining member 200, trigger member 250, spring 230, and axles 206, 256 are omitted. Accordingly, the arms 110 would be electromagnetic and be connected to the electrical source 350 for selectively coupling the first pins 322' to the grooves 113 in the arms.

When it is desirable to release the gondola 310 the electrical path between the arms 110 and electrical source 350 is interrupted. The arms 110 become nonmagnetic, thereby releasing the connection to the magnetic pins 322'. Consequently, the upward force of the rising balloon 302 pulls the pins 322' out of the grooves 113, allowing the gondola 310 to rise with the balloon into the sky.

The release mechanism 150' operates in the same way as the release mechanism 150 in that the pins 322' are released from the grooves 113 when the angle $\Phi_2$ reaches the predetermined amount. One or more sensors (not shown) can track the angle $\Phi_2$ as the aircraft 300 rises and automatically interrupt electrical communication between the electrical source 350 and the electromagnetic arms 110 when the angle $\Phi_2$ is reached. Accordingly, the release mechanisms 150' hold onto the aircraft 300 while the aircraft has a first orientation relative to the release mechanism, e.g., the angle $\Phi_2$ is less than the predetermined amount, and automatically releases the aircraft when the aircraft has a second, different orientation relative to the release mechanisms, e.g., the angle $\Phi_2$ reaches the predetermined amount.

In both release mechanisms 150, 150', the predetermined amount of the angle $\Phi_2$ between the launch arm 100 and the tether 312 helps ensure minimal lateral load is applied to the aircraft 300 during release and helps prevent swinging of the gondola 310 from the balloon 302 during release.

The launch arm 100 and release mechanism 150 of the present invention are designed to automatically account for varying amounts of wind W acting on the apparatus 30 during launch. To this end, the degree of rotation $R_2$ by the launch arm 100 depends not only on the rising aircraft 300 but also the intensity of the wind W. When wind W speed is negligible, the launch arm 100 pivots in the direction $R_2$ to a near vertical position at release such that the angle $\Phi_1$ approaches 90° (see FIG. 7C).

As the wind W speed increases, rotation of the launch arm 100 in the direction $R_2$ increase, thereby decreasing the launch angle $\Phi_1$ and resulting in a lower launch height above the ground. The wind W maintains the launch arm 100 at the lower launch height, which allows the tether 312 to become taught. Consequently, the angle $\Phi_2$ between the tether 312 and launch arm 100 increases with the rising balloon 302 until the predetermined angle $\Phi_2$ is reached. At that point, the release mechanisms 150 automatically release the first pins 322 and allow the gondola 310 and tether 312 to rise with the balloon 302 from the lower launch height.

Due to the decreased launch angle $\Phi_1$, the gondola 310 is released closer to the ground compared to when the launch arm 100 is near vertical, i.e., when the wind W speed is zero or negligible. The launch arm 100 and tether 312, however, are specifically configured to ensure the gondola 310 does not strike the ground when released from the lower launch height. Furthermore, the release mechanisms 150, 150' ensure the gondola 310 is gently raised from the support member 70 by the rising balloon 302 in a controlled and fluid manner. The release mechanisms 150, 150' and launch arm 100 also ensure the gondola 310 rises to a predetermined height above the ground before being released sufficient to prevent the gondola from striking the ground or the launch arm upon release.

Figure 10:
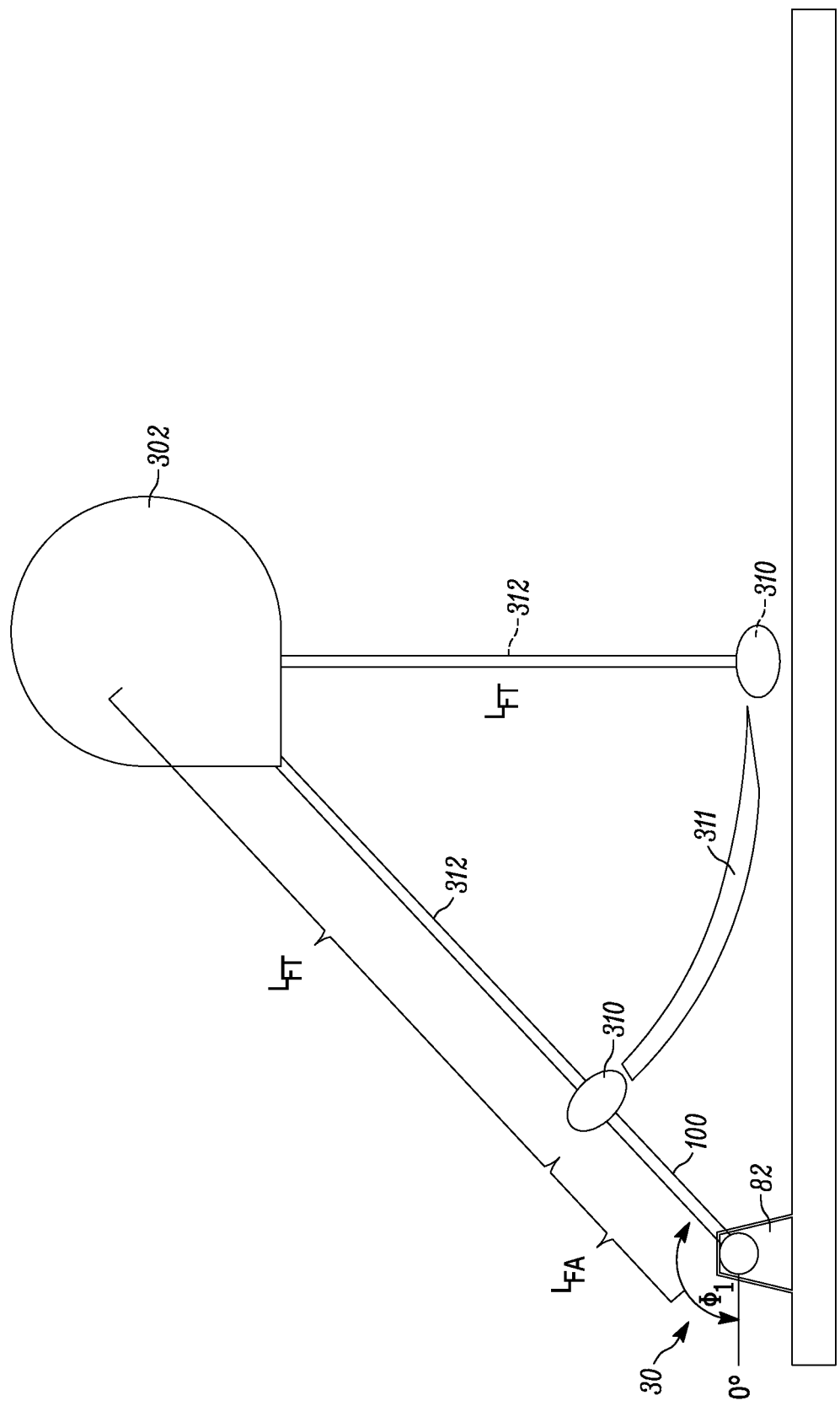
FIG. 10 is a diagram illustrating how some components of the launch apparatus are sized.

To this end, FIG. 10 illustrates the geometry of the apparatus 30 and aircraft 300. The minimum length $L_{LA}$ of the launch arm 100, in terms of the length $L_{TM}$ of the tether 312 and the launch angle $\Phi_1$, needed to ensure the launch arm is long enough to prevent the gondola 310 from contracting the ground after launch is dictated by the formula:

$$L_{LA}=L_{TM}(1-\sin \Phi_1)/\sin \Phi_1$$

The potential/projected swing trajectory of the gondola 310 when released from the launch arm 100 is indicated at 311. As the projected or possible wind W speed increases, the launch angle $\Phi_1$ decreases, which increases the launch arm length $L_{LA}$, assuming a constant length $L_{TM}$ for the tether 312. Consequently, users in the field can readily retrofit the appropriate length $L_{LA}$ of the launch arm 100 to account for the measured and/or expected wind speeds in a particular location. This avoids the need to change the aircraft 300 in any way and allows for a high degree of variation in launch conditions for the release of the aircraft 300.

The apparatus of the present invention is also advantageous in that, due to the automatic release by the mechanisms 150, the dependence upon humans for actually launching the aircraft 300 is eliminated. The apparatus 30 is compact, highly portable, inexpensive, and readily adjustable such that the number of launch locations can be increased, the setup/planning time to launch decreased, and the number of people required for launch decreased. The pivoting connection between the launch arm 100 and support member 70 helps guide the initial launch trajectory of the aircraft 300 with a lower acceleration than conventional launch devices. The automated adjustment by the pivoting support member 70 and rotating launch arm 100 allow the aircraft 300 to be launched in higher wind W speeds, e.g., on the order of 25 knots, than current launch devices.

Moreover, the apparatus of the present invention operates in a manner that helps ensure the full weight of the gondola 310 is completely transferred to the tether 312 in a smooth and controlled manner before the aircraft 300 is released. When the gondola 310 is ultimately released, the predetermined length $L_{LA}$ of the launch arm 100 ensures that any swinging experienced by the gondola upon release does not result in the released gondola striking the ground or the apparatus 30.

The preferred embodiments of the invention have been illustrated and described in detail. However, the present invention is not to be considered limited to the precise construction disclosed. Various adaptations, modifications and uses of the invention can occur to those skilled in the art to which the invention relates and the intention is to cover hereby all such adaptations, modifications, and uses which fall within the spirit or scope of the appended claims.

Having described the invention, the following is claimed:

1. An apparatus for launching an aircraft secured to a balloon by a tether comprising:
   a support member;
   a launch arm connected to the support member and rotatable relative to the support member about an axis; and
   at least one mechanism for releasably connecting the aircraft to the launch arm, each release mechanism comprising a retaining member for receiving a first pin of the aircraft and a trigger member coupled to the retaining member for releasing the aircraft from the retaining member,
   the release mechanism having a first condition securing the aircraft to the launch arm when the aircraft has a first orientation relative to the launch arm, the release mechanism having a second condition automatically releasing the aircraft from the launch arm in response to the aircraft moving to a second orientation relative to the launch arm different from the first orientation,
   the aircraft further including a bracket and a second pin extending from the bracket, the retaining member and the trigger member cooperating to retain the first pin of the aircraft while the aircraft has the first orientation, the bracket pivoting about the first pin as the balloon lifts the aircraft until the second pin automatically moves the trigger member out of engagement with the retaining member when the aircraft reaches the second orientation to allow the retaining member to release the first pin of the aircraft.

2. The apparatus recited in claim 1, further comprising a base for placement on a surface and being connected to the support member, the support member being pivotable relative to the base within a plane extending perpendicular to a plane through which the launch arm rotates.

3. The apparatus recited in claim 2, wherein the support member is pivotable relative to the base through a range of about 45°.

4. The apparatus recited in claim 1, wherein the retaining member and the trigger member are each rotatably mounted in a frame, the trigger member including a tab that engages a notch in the retaining member to prevent the first pin of the aircraft from exiting the retaining member.

5. The apparatus recited in claim 1, further comprising a spring having a first end connected to the retaining member and a second end connected to the trigger member for biasing the release mechanism into the first condition.

6. The apparatus recited in claim 1, wherein the release mechanism is in the first condition when the angle between the launch arm and the tether is below a predetermined degree, the release mechanism moving to the second condition when the angle between the launch arm and the tether reaches the predetermined degree.

7. The apparatus recited in claim 6, wherein the at least one release mechanism releases the aircraft from the launch arm when the tether and the launch arm are substantially longitudinally aligned with one another.

8. An apparatus for launching an aircraft secured to a balloon by a tether comprising:
   a support member;
   a launch arm connected to the support member and rotatable relative to the support member about an axis; and
   at least one mechanism for releasably connecting the aircraft to the launch arm, each release mechanism comprising a retaining member for receiving a first pin of the aircraft and a trigger member coupled to the retaining member for releasing the aircraft from the retaining member,
   the release mechanism having first condition securing the aircraft to the launch arm when the aircraft has a first orientation relative to the launch arm in which the angle between the launch arm and the tether is below a predetermined degree, the release mechanism having a second condition automatically releasing the aircraft from the launch arm in response to the aircraft moving to a second orientation relative to the launch arm in which the angle between the launch arm and the tether reaches the predetermined degree, the retaining member and the trigger member cooperating to retain the first pin of the aircraft when the angle between the launch arm and the tether is below the predetermined degree, the trigger member automatically moving relative to the retaining member when the angle between the launch arm and the tether reaches the predetermined degree, the aircraft further including a bracket and a second pin extending from the bracket, the bracket pivoting about the first pin as the balloon lifts the aircraft until the second pin moves the trigger member out of engagement with the retaining member when the aircraft reaches the second orientation to allow the retaining member to release the first pin of the aircraft.

9. The apparatus recited in claim 1, wherein the launch arm includes a pair of arms defining a space for receiving the aircraft, one of the release mechanisms being secured to each arm with each release mechanism releasably securing a pin on the aircraft.

10. The apparatus recited in claim 1, wherein each release mechanism is electromagnetic and selectively energized to place the release mechanism in the first condition or the second condition.

11. An apparatus for launching an aircraft secured to a balloon by a tether comprising:

a base for placement on a surface;

a support member pivotably mounted to the base within a first plane;

a launch arm connected to the support member and rotatable relative to the support member within a second plane perpendicular to the first plane; and a plurality of release mechanisms connecting the aircraft to the launch arm, each release mechanism comprising a retaining member for receiving a first pin of the aircraft and a trigger member coupled to the retaining member for automatically releasing the aircraft from the retaining member, the release mechanisms having a first condition securing the aircraft to the launch arm when an angle between the launch arm and the tether is below a predetermined degree, the release mechanisms moving to a second condition automatically releasing the aircraft from the launch arm in response to the angle between the launch arm and the tether reaching the predetermined degree, the retaining member and the trigger member cooperating to retain the first pin of the aircraft while the aircraft has the first orientation, the trigger member automatically moving relative to the retaining member when the aircraft reaches the second orientation, the aircraft further including a bracket and a second pin extending from the bracket, the bracket pivoting about the first pin as the balloon lifts the aircraft until the second pin moves the trigger member out of engagement with the retaining member when the aircraft reaches the second orientation to allow the retaining member to release the first pin of the aircraft.

12. The apparatus recited in claim 11, wherein the support member is pivotable relative to the base through a range of about 45°.

13. The apparatus recited in claim 11, wherein the retaining member and the trigger member are each rotatably mounted in a frame, the trigger member including a tab that engages a notch in the retaining member to prevent the portion of the aircraft from exiting the retaining member.

14. The apparatus recited in claim 11, further comprising a spring having a first end connected to the retaining member and a second end connected to the trigger member for biasing the release mechanism into the first condition.

15. The apparatus recited in claim 11, wherein each release mechanism is electromagnetic and selectively energized to place the release mechanism in the first condition or the second condition.

16. The apparatus recited in claim 1, wherein placing the aircraft in the second orientation causes the release mechanism to automatically release the aircraft from the launch arm.

17. The apparatus recited in claim 1, wherein the release mechanism moves from the first condition to the second condition without human dependence.

18. The apparatus recited in claim 11, wherein placing the aircraft in the second orientation causes the release mechanism to automatically release the aircraft from the launch arm.

19. The apparatus recited in claim 11, wherein the release mechanism moves from the first condition to the second condition without human dependence.

* * * * *

UNITED STATES PATENT AND TRADEMARK OFFICE
CERTIFICATE OF CORRECTION

PATENT NO. : 9,834,321 B2
APPLICATION NO. : 14/686330
DATED : December 5, 2017
INVENTOR(S) : Taylor Evan Matthews et al.

Page 1 of 1

It is certified that error appears in the above-identified patent and that said Letters Patent is hereby corrected as shown below:

In the Claims

Column 8, Line 60 In Claim 8, reads "having first" should read --having a first--

Signed and Sealed this
Thirteenth Day of February, 2018

Andrei Iancu
*Director of the United States Patent and Trademark Office*